J. S. MULLEN.
COTTON SEED LINTER.
APPLICATION FILED DEC. 30, 1914.

1,220,879.

Patented Mar. 27, 1917.
2 SHEETS—SHEET 1.

J. S. MULLEN.
COTTON SEED LINTER.
APPLICATION FILED DEC. 30, 1914.

1,220,879.

Patented Mar. 27, 1917.
2 SHEETS—SHEET 2.

Witnesses
G. F. Baker.
E. K. Greenewald.

Inventor
J. S. Mullen
by Foster Freeman Watson & Coit
Attorneys

UNITED STATES PATENT OFFICE.

JAMES S. MULLEN, OF McRAE, GEORGIA, ASSIGNOR TO HUGH E. SESSIONS, OF COLUMBIA, SOUTH CAROLINA.

COTTON-SEED LINTER.

1,220,879. Specification of Letters Patent. Patented Mar. 27, 1917.

Application filed December 30, 1914. Serial No. 879,737.

*To all whom it may concern:*

Be it known that I, JAMES S. MULLEN, a citizen of the United States, residing at McRae, Telfair county, State of Georgia, have invented certain new and useful Improvements in Cotton-Seed Linters, of which the following is a specification.

My invention relates to cotton seed linters or machines for removing from the cotton seed the lint which adheres to them after most of the lint has been removed by being passed through the ordinary cotton gin.

I have found that adjusting the mote board in such machines so that there is an inlet for air under the mote board is not entirely satisfactory. To overcome this objection I have provided means to prevent a draft from beneath the mote board. With this improvement in the machine all of the draft may be shut off from entering at the back and the brush will be forced to draw from the front all of the air that passes through the delinted seed as they fall from the cylinders. I have accordingly provided an inlet opening in the casing in the wall thereof opposite the inlet to the flue provided by the mote board, whereby a current of air will flow into the casing, through the delinted seed and also through the material descending from the space between the brush and saw cylinders and out through said flue.

Figure 1:
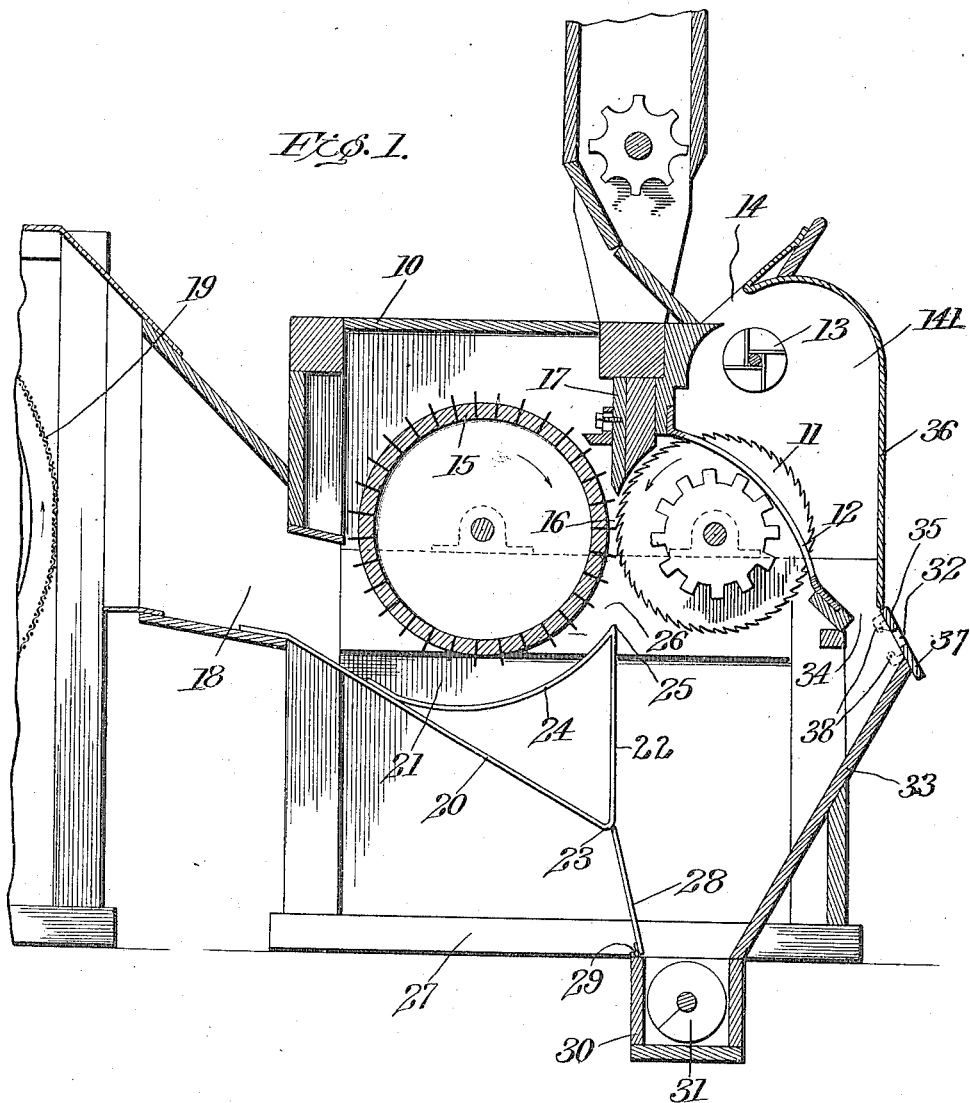
Figure 2:
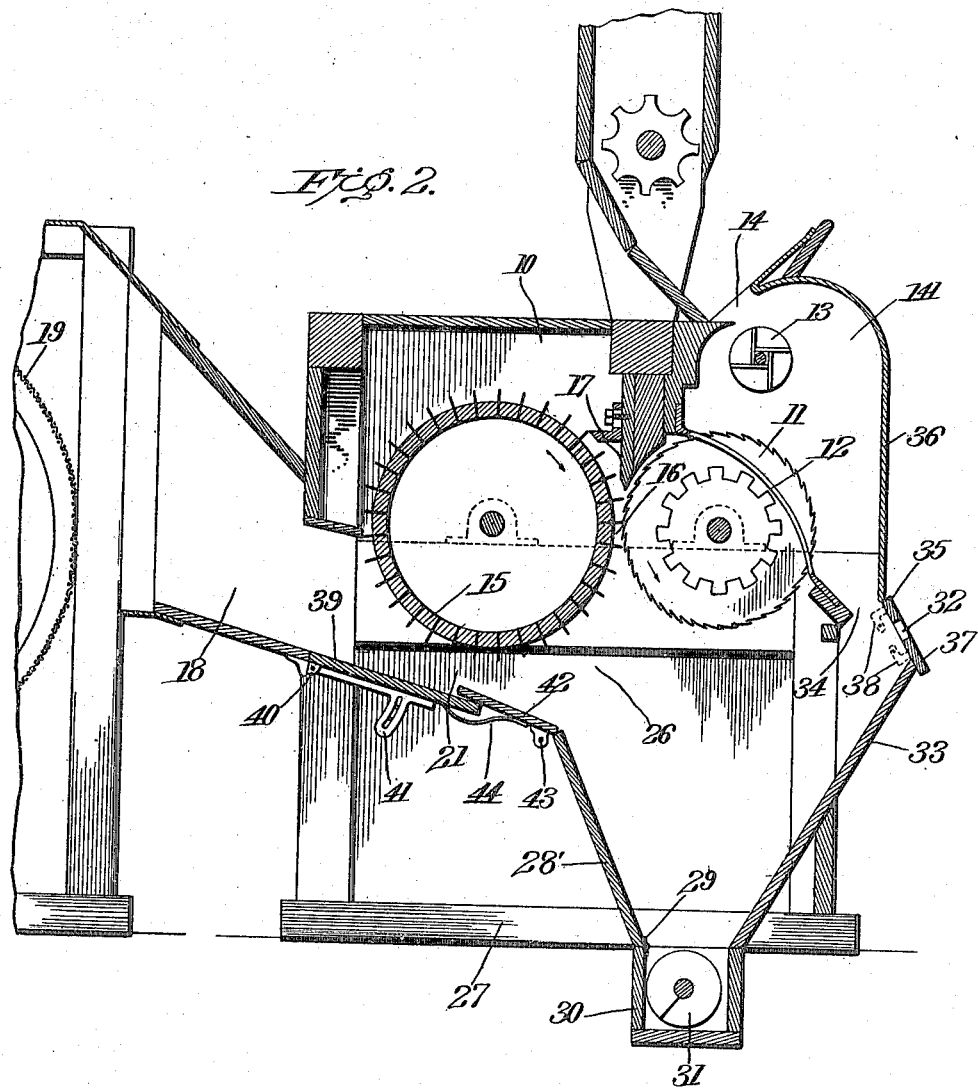

The novel features of my invention will be apparent from the following description taken in connection with the accompanying drawings, in which, Figure 1 illustrates a delinting machine embodying my invention and Fig. 2 illustrates another form of machine also embodying my invention.

Referring to Fig. 1 of the drawing, the delinting mechanism is inclosed within an outer casing or housing 10 which supports and surrounds the working parts. In this casing there is a saw cylinder 11, the saws of which work between the ribs 12 and engage the seed which are agitated by the rotating float 13 located beneath the inlet 14 of the seed chamber or hopper 141 which is disposed adjacent the saw cylinder so as to feed seed to the latter. The brush cylinder 15 is mounted parallel to the saw cylinder 11 and the ends of the bristles on the brush cylinder approach closely the periphery of the saw cylinder at the point 16, it being understood that the periphery of the brush cylinder moves more rapidly than the periphery of the saw cylinder so as to brush the lint downwardly from the saw cylinder. The cylinders rotate in the directions indicated by the arrows. An adjustable air regulating board 17 is placed above and between the cylinders so as to control the passage of the air down between them.

A flue 18 leads upwardly from a point on the outer side of the brush cylinder 15 and discharges the lint upon the usual lint collecting wire cylinder 19. It will be understood that the draft which carries the lint up through the flue 18 is created by the brush cylinder 15 which rotates at a high speed immediately in front of and above the entrance of that flue.

A mote board 20 extends downwardly at an angle from the front edge of the bottom of the flue 18 and is spaced a distance from the bottom of the cylinder 15 to form a flue 21 located between the bottom of the cylinder 15 and the mote board. The flue 18 is a continuation of the flue 21.

At the inner end of the mote board 20 there is a part 22 which extends upwardly into the space between the cylinders 11 and 15 from the lower edge 23 of the mote board and a curved part 24 extends from the upper edge 25 of the part 22 rearwardly under the cylinder 15 and is secured to the mote board 20. The part 22 serves to divide the particles of lint from the motes and trash. The edge 25 is directly below the point or line 16 where the cylinders 11 and 15 most closely approach each other and is spaced from that point so as to provide an inlet 26 for the flue 21.

Heretofore the space between the edge 23 and the bottom or floor 27 of the casing 10 has been left open so that a current of air might enter the flue 21 from beneath the mote board 20. I find that it is more satisfactory to shut off all of the draft from beneath the mote board and I have accordingly provided a partition 28 which extends downwardly from the lower edge 23 of the mote board at an inclination to the floor and may be hinged at 29 on the upper edge of one side of the casing 30 for the conveyer 31. The draft entering from beneath the mote board 20 and into the space beneath the cylinders may thus be entirely shut off and the brush 16 is forced to draw all its draft from the front of the machine past the division board 17 or from the opening 32.

On the side of the conveyer casing 30 opposite the hinged partition 28 there is an inclined partition or wall 33 which extends downwardly from the opening 32 to the front wall of the conveyer casing 30, the latter being located below the floor or bottom 27 of the housing 10. The inclined wall 33 serves as a chute to deliver the seed discharging from the spout 34 to the conveyer 31. The size of the opening 32 is adjustable. An adjustable board 35 extends across the lower edge of the front wall 36 of the housing and an adjustable board 37 extends across the upper edge of the inclined wall 33. The boards 35 and 37 are spaced apart and leave between them the narrow slot-like opening 32 which extends the entire width of the front of the casing and is located adjacent and below the spout 34 from which the seed discharges. Angular plates 38 or other suitable means are provided at the ends of the boards 35 and 37 whereby the slot-like opening 32 between them may be made wider or narrower as desired to control the draft. The air entering from the opening 32 and from other points to the right of or above the point 16 is therefore compelled to cross the delinted seed and motes descending to the conveyer 31 from the point 16, and also across the seed discharging from the spout 34 and separates therefrom any lint carried down through the spout 34. There will be an upward current of air moving toward the inlet 26 of the flue 21 and in a direction opposite to the movement of the seed, motes, etc. This contrary current of air will pick up any loose lint that may be following the seed and trash downwardly and will carry the lint through the flues 21 and 18 to the condensing cylinder 19.

Fig. 2 illustrates another machine embodying my invention and in most respects similar to the machine shown in Fig. 1. The mote board illustrated in the machine shown in Fig. 2 comprises a main board 39 hinged at 40 to the housing 10 and provided with an attachment 41 on its under side whereby it may be adjusted in any desirable angular position. A supplemental board 42 pivoted at 43 on the side walls of the casing extends rearwardly and has its free end resting on and overlapping the forward or lower end of the main board 39. A spring 44 which is fastened at one end to the under side of the board 42 extends rearwardly and engages the under side of the board 39 and yieldingly holds the free end of the board 42 in engagement with the top of the board 39. The partition 28', corresponding to the partition 28 shown in Fig. 1, extends from the forward edge 45 of the board 42 to the upper edge of the wall 30, which constitutes part of the housing for the conveyer 31. The compound mote board composed of the boards 39 and 42 is spaced from the brush cylinder 15 and forms the lint flue 21 which has its inlet substantially below the space between the brush cylinder 15 and the saw cylinder 11 and opposite the air inlet 32, whereby the air entering that inlet will pass across the seed discharging from the spout 34 and across the seed, motes and trash falling downwardly from the point 16 so as to separate the lint and carry it out through the flues 21 and 18 to the condensing cylinder 19.

It will be understood that the cylinders and partitions are so disposed as to completely close the space between them at the sides so that there will be no side drafts at any points to interfere with the proper separation of the lint from the motes.

While I have described my invention in detail I do not wish to be limited to the exact construction disclosed. It will be observed that one of the main features of my invention is the use of the partitions 28 and 28' which extend from the inner end of the mote board to the conveyer, cutting off any draft of air entering from the rear beneath that end of the mote board. It will be evident that this feature of the invention is adapted for use with various forms of mote boards and is not limited to the type shown.

Having thus described the invention, what is claimed and desired to be secured by Letters Patent is:

1. In a cotton seed linter, the combination of a casing, a saw cylinder therein capable of delinting cotton seed, a seed hopper located adjacent said saw cylinder and having a discharge outlet for delinted seed, a brush cylinder adapted to brush lint downwardly from said saw cylinder, and a mote board spaced from the under side of said brush cylinder and forming therewith an outlet flue beneath the brush cylinder, means for preventing the entrance of air to said flue from beneath said mote board, said casing having an air inlet opening therein on the side thereof opposite the inlet of said flue whereby air entering said inlet in the casing will pass through seed descending from said discharge outlet and through the material descending from the space between said cylinders so as to separate loose lint therefrom and carry it out through said flue.

2. In a cotton seed linter, the combination of a casing, a saw cylinder therein capable of delinting cotton seed, a seed hopper located adjacent said saw cylinder and having a discharge outlet for delinted seed, a brush cylinder adapted to brush lint downwardly from said saw cylinder, and a mote board spaced from the under side of said brush cylinder and forming therewith an outlet flue beneath the brush cylinder having an inner portion extending downwardly to the floor at an angle preventing the entrance of air to said flue from beneath the mote board, said casing having an air inlet opening therein on the side thereof opposite the inlet of said flue whereby air entering said inlet in the casing will pass through seed descending from said discharge outlet and through the material descending from the space between said cylinders so as to separate loose lint therefrom and carry it out through said flue.

3. In a cotton seed linter, the combination of a casing, a saw cylinder therein capable of delinting cotton seed, a seed hopper located adjacent said saw cylinder and having a discharge outlet for delinted seed, a brush cylinder adapted to brush lint downwardly from said saw cylinder, a mote board spaced from the under side of said brush cylinder and forming therewith an outlet flue beneath the brush cylinder, means for shutting off the draft from beneath said mote board, and a device for receiving the seed, motes and trash descending from said discharge outlet and from the space between said cylinders, said casing having an air inlet opening therein on the side thereof opposite the inlet of said flue whereby air entering said air inlet in the casing will pass through the seed descending from said discharge outlet and through the material descending from the space between said cylinders so as to separate loose lint therefrom and carry it out through said flue.

4. In a cotton seed linter, the combination of a casing, a saw cylinder therein capable of delinting cotton seed, a brush cylinder adapted to brush lint downwardly from said saw cylinder, a mote board spaced from the under side of the brush cylinder and forming therewith an outlet flue beneath the brush cylinder, means for leading the delinted seed away from the saw cylinder, means for preventing the entrance of air to said flue from beneath said mote board, said casing having an air inlet opening therein on the side thereof opposite the inlet of said flue whereby air entering said opening in the casing will pass through the delinted seed and other descending material and out through the flue above said mote board.

5. In a cotton seed linter, the combination of a casing, a saw cylinder therein capable of delinting cotton seed, a brush cylinder adapted to brush lint downwardly from said saw cylinder, a mote board spaced from the under side of the brush cylinder and forming therewith an outlet flue beneath the brush cylinder, means for leading the delinted seed away from the saw cylinder, means for preventing the entrance of air to said flue from beneath said mote board, said casing having an air inlet opening therein on the side thereof opposite the inlet of said flue whereby air entering said opening in the casing will pass through the delinted seed and other descending material and out through the flue above said mote board, and means for varying the size of said air inlet opening to control the admission of air.

6. In a cotton seed linter, the combination of a casing, a saw cylinder therein capable of delinting cotton seed, a brush cylinder adapted to brush lint downwardly from said saw cylinder, means at the front of said casing for leading the delinted seed away from the saw cylinder, the said casing being provided with an air inlet opening at its front whereby a current of air is caused to cross the delinted seed and pass through material descending from the space between the cylinders, and means for varying the size of said air inlet opening to control the admission of air.

7. In a cotton seed linter, the combination of a casing, a saw cylinder therein, a brush cylinder adapted to brush lint downwardly from said saw cylinder, a mote board beneath the brush cylinder forming therewith an outlet flue beneath the brush cylinder, a conveyer at the bottom of said casing adapted to receive and convey away trash and motes, means at the front of said casing for discharging downwardly delinted seed, an inclined partition leading from said seed discharge to said conveyer for guiding the seed to said conveyer, and means for permitting air to pass from the front of the casing through the descending seed to said outlet flue.

8. In a cotton seed linter, the combination of a casing, a saw cylinder therein, a brush cylinder adapted to brush lint downwardly from said saw cylinder, a mote board beneath the brush cylinder forming therewith an outlet flue beneath the brush cylinder, a conveyer at the bottom of said casing adapted to receive and convey away trash and motes, means at the front of said casing for discharging downwardly delinted seed, an inclined partition leading from said seed discharge to said conveyer for guiding the seed to said conveyer, means for permitting air to pass from the front of the casing through the descending seed to said outlet flue, and means for preventing air from entering said outlet flue from beneath said mote board.

9. In a cotton seed linter, the combination of a casing, a saw cylinder therein, a brush cylinder adapted to brush lint downwardly from said saw cylinder, a mote board beneath the brush cylinder forming therewith an outlet flue beneath the brush cylinder, a conveyer at the bottom of said casing adapted to receive and convey away trash and motes, means at the front of said casing for discharging downwardly delinted seed, an inclined partition leading from said seed discharge to said conveyer for guiding the seed to said conveyer, and means for regulating the amount of air permitted to pass from the front through said descending seed to said outlet flue.

10. In a cotton seed linter, the combination of a casing, a saw cylinder therein, a brush cylinder adapted to brush lint downwardly from said saw cylinder, a mote board beneath the brush cylinder forming therewith an outlet flue beneath the brush cylinder and having a portion at its inner end extending downwardly at an angle to the floor of the casing, and means at the front of said casing for regulating the admission of air below said saw cylinder.

11. In a cotton seed linter, the combination of a casing, a saw cylinder therein, a brush cylinder adapted to brush lint downwardly from said saw cylinder, a mote board beneath the brush cylinder forming therewith an outlet flue beneath the brush cylinder and having a portion at its inner end extending downwardly at an angle to the floor of the casing, means at the front of said casing for regulating the admission of air below said saw cylinder, and means for discharging delinted seed at the front of said casing across the entering air.

In testimony whereof I affix my signature in presence of two witnesses.

JAMES S. MULLEN.

Witnesses:
W. C. DIXON,
R. T. HUMBER, Jr.

Copies of this patent may be obtained for five cents each, by addressing the "Commissioner of Patents, Washington, D. C."